March 24, 1959 J. E. VOORHEES ET AL 2,878,961
VENDING MACHINE
Filed March 4, 1955 6 Sheets-Sheet 1

INVENTOR.
Albert M. Rockwood
John E. Voorhees
BY Gray, Mase & Dunson
ATTORNEYS.

March 24, 1959    J. E. VOORHEES ET AL    2,878,961
VENDING MACHINE

Filed March 4, 1955    6 Sheets-Sheet 2

INVENTOR.
Albert M. Rockwood
John E. Voorhees
BY
Gray, Mase & Dunson
ATTORNEYS.

March 24, 1959     J. E. VOORHEES ET AL     2,878,961
VENDING MACHINE

INVENTOR.
Albert M. Rockwood
John E. Voorhees
ATTORNEYS.

March 24, 1959 J. E. VOORHEES ET AL 2,878,961
VENDING MACHINE
Filed March 4, 1955 6 Sheets-Sheet 4
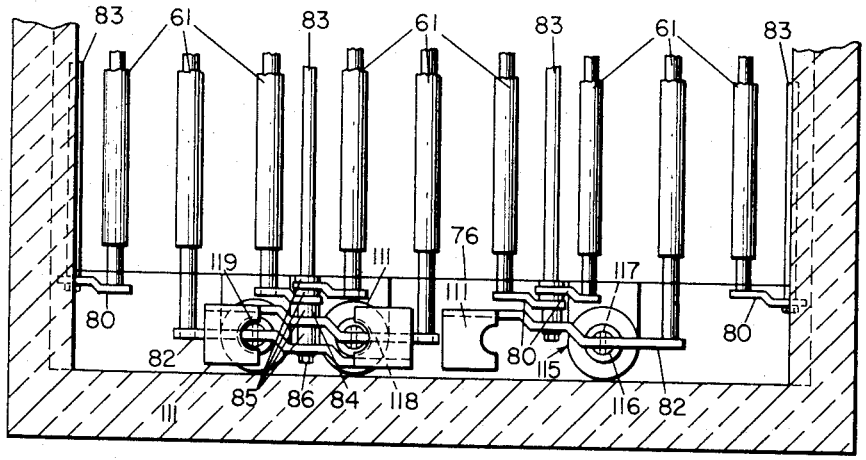
Fig-9
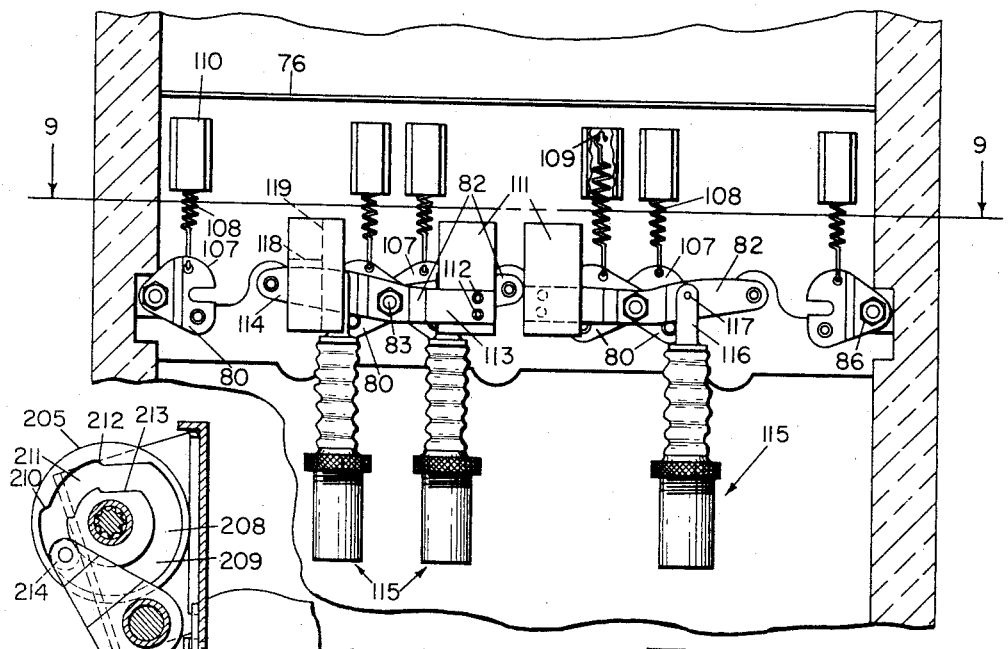
Fig-8
Fig-19
INVENTOR.
Albert M. Rockwood
John E. Voorhees
BY
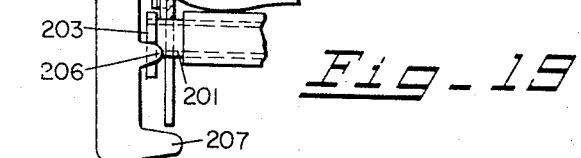
ATTORNEYS.

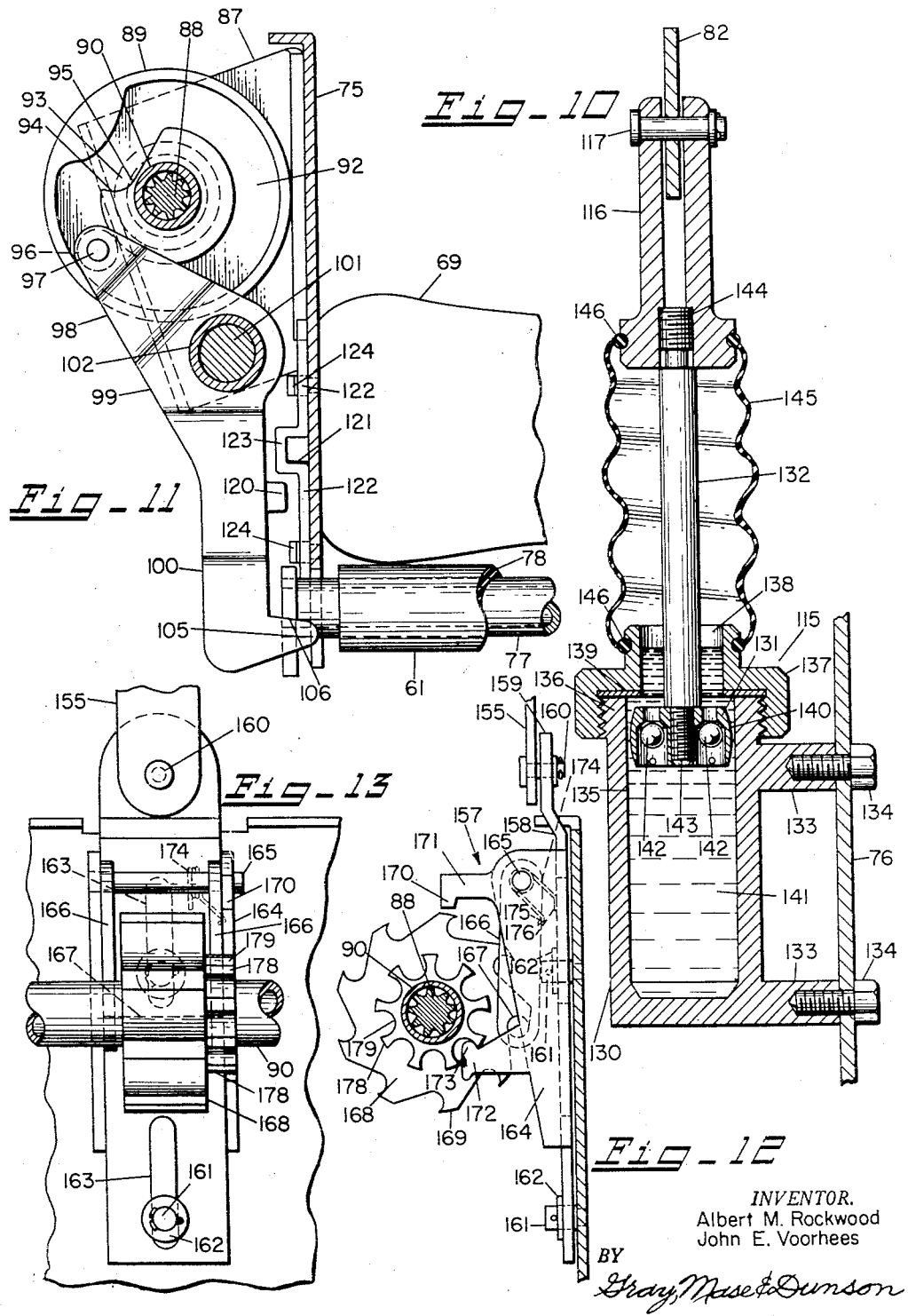

March 24, 1959     J. E. VOORHEES ET AL     2,878,961
VENDING MACHINE
Filed March 4, 1955     6 Sheets-Sheet 6
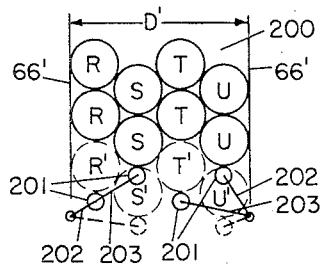
Fig_18
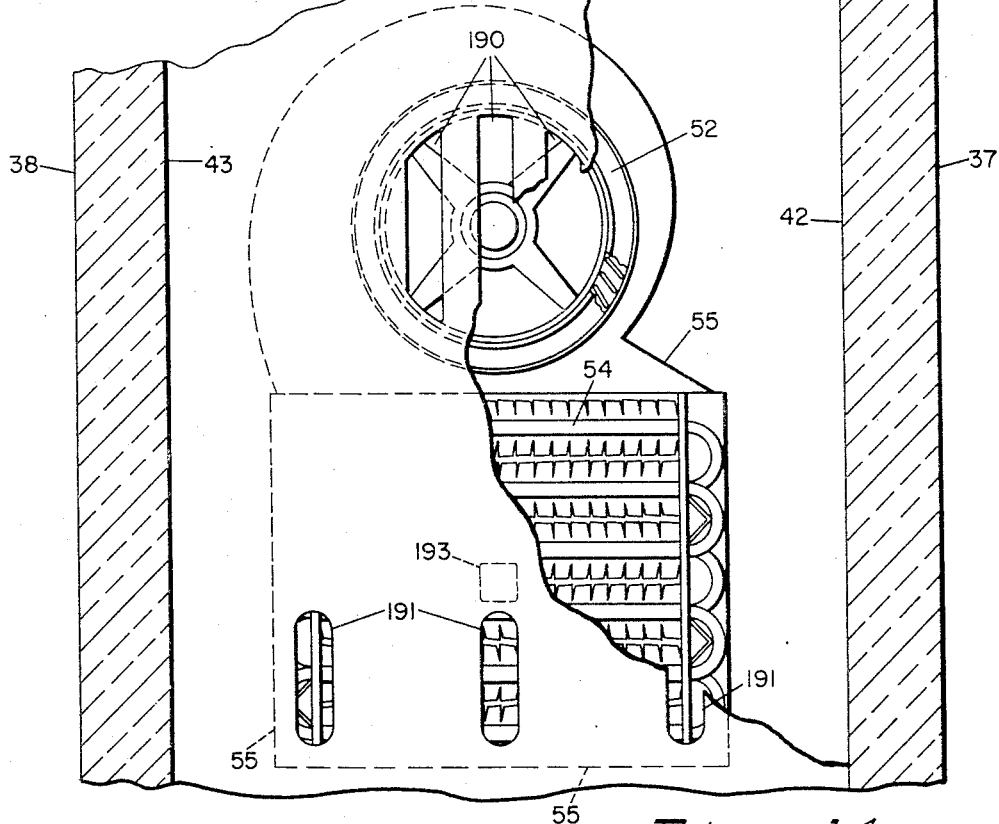
Fig_14
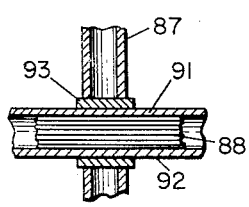
Fig_15
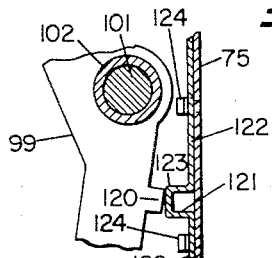
Fig_16
*INVENTOR.*
Albert M. Rockwood
John E. Voorhees
BY *Gray, Mase & Dunson*
ATTORNEYS.

United States Patent Office 2,878,961
Patented Mar. 24, 1959

2,878,961

VENDING MACHINE

John E. Voorhees and Albert M. Rockwood, Columbus, Ohio, assignors, by mesne assignments, to Cavalier Corporation, Chattanooga, Tenn., a corporation of Tennessee Application March 4, 1955, Serial No. 492,268

19 Claims. (Cl. 221—16)

This invention relates to automatic vending machines of the kind particularly adapted to dispense conventional kinds of beverage bottles and substantially cylindrical articles one at a time when a suitable coin or token is deposited in the machine.

A feature of this invention is a novel arrangement of storing the cylindrical articles.

Another feature is a novel apparatus for dispensing one article at a time from the arrangement in storage.

A further feature of this invention is a damping device adapted to operate with minimum friction through a wide variety of temperature and loading ranges enabling the dispensing mechanism to function properly under these conditions.

Still another feature of this arrangement is a ratchet stop-and-lock mechanism for elimination of vending errors and the production of foolproof operation.

Another feature of this invention is cooling and refrigeration apparatus and a method of operating this apparatus whereby newly loaded articles are refrigerated to the proper vending temperature with minimum temperature rise of previously stored and refrigerated articles.

Briefly, the vending machine of this invention comprises an insulated enclosure containing a series of vertically disposed adjacent chambers, each chamber of which has oppositely disposed parallel walls spaced apart a distance such that the articles to be vended are stored in interlocking relationship with their longitudinal axes horizontal. In these chambers are disposed three or more stacks of articles to be vended in overlapping staggered relationship. Dispensing apparatus having a support member is positioned beneath each stack and adapted to individually move from beneath the stack, actuated by the weight of an article in the stack, upon the release of a catch. The catch is embodied in a lever that is controlled by a cam on a cam shaft. The cam shaft is rotated in progressive sequential steps by a self-locking ratchet which is motivated by means operated by the vendee.

The articles of each stack are individually released in the same manner by individual cams located on the cam shaft which is common to all.

Damping units are provided in this invention to control the descent of the articles where necessary. These damping units comprise: a cylinder, open at the top; a piston operable in said cylinder, having a spherical peripheral surface and check valve means disposed in the body portion thereof; and a piston rod connected at the center thereof; a fluid in the cylinder providing a damping effect by its controlled flow around the sides of the piston; and an accordion-type boot fastened between the open end of the cylinder and the piston rod.

The refrigerating apparatus of this invention comprises: a conventional evaporator in a compartment behind those articles next to be vended and operated by compressor means disposed in close proximity thereto; a fan disposed above the evaporator suitably connected thereto by ducting in the same chamber as the evaporator; an aperture from each chamber of the article storage compartment into the compartment of the evaporator and fan, located in the rear of the position of those articles next to be vended; an aperture from the bottle storage compartment to the fan; and control means whereby the fan may be operated at more than one speed to adjust the temperature of the air leaving the evaporator to prevent raising the temperature of refrigerated bottles during the period when newly inserted unrefrigerated bottles are being brought to vending temperature.

It is an object of this invention to provide a vending machine wherein cylindrical objects are stored with maximum use of available space and as a consequence thereof, greatly increased storage capacity and vending capacity. It is an object of this invention to provide a vending machine wherein the articles are stored in columns having three or more staggered interlocking vertical stacks in each chamber and in which individual articles from each stack may be vended. It is a further object of this invention to provide a dispensing mechanism for a vending machine which is simple to operate and rugged in construction. Another object of this invention is to provide a vending machine for cylindrical objects having an innercompartment provided with one or more chambers adapted to contain three or more vertical stacks of articles arranged in staggered relationship; whereby retention of adjacent stacks against gravitational downward movement is provided by the interlocked position of the articles in the chamber, there being a horizontal retention member beneath the lowermost article in each stack, which retention member is operable to rotate to a position out from beneath the stack or away from beneath the stack, so that one bottle in the stack is released.

It is still a further purpose of this invention to provide a vending machine for vending bottled beverages comprising: a cabinet having a plurality of vertically disposed partitions therein, dividing the cabinet into a plurality of vertically disposed chambers, each adapted to receive a plurality of bottles in stacks, with interconnected cam and latch means for each one of the stacks; and actuating means for simultaneously actuating all the cam means to allow one bottle from one stack to be dispensed upon an operation of the cam means, successive operations of the cam means allowing a bottle to be dispensed from another stack until all of the stacks have had their lowermost bottles dispensed therefrom, at which time the cycle is repeated.

Other objects of the present invention include the way in which horizontal support members release bottles singularly while preventing a dropping action on the part of any bottle within the machine; the manner in which movement is imparted to the support members by means of a single intermittently rotated cam shaft; and details of construction affording synchronization of movement among the several parts of machine when the same is placed in operation.

It is yet another purpose of this invention to provide a positively locking ratchet mechanism whereby the cam shaft is imparted intermittent rotary motion and is positively locked against rotation in either direction during stationary periods in the motion cycle.

It is a further purpose of this invention to provide a damping device having a spherically contoured piston operable in a cylinder with slight clearance and in the presence of a fluid; whereby the piston rod may operate askew to the longitudinal axis of the cylinder without detriment to the functioning of the damper, and whereby this construction provides a damping device operable with little change in resistance throughout a large variation in operating temperature and loading conditions.

It is a purpose of this invention to provide vending machine cooling means comprising refrigeration apparatus, a circulating fan, suitable ducting with inlet and outlet provisionings, and suitable controls to provide fan operation at at least two speeds so that the temperature of the circulating cooling air leaving the evaporator may be controlled to prevent the temperature of previously loaded and refrigerated bottles from being raised during the refrigeration of recently loaded warm bottles.

From the days of the earliest vending machines until the present time a major object in the construction of such machines has been to increase the number of articles in storage to be vended in combination with the provision of the most foolproof vending apparatus.

With the advent of vending refrigerated articles, it is clear that a major goal to be achieved is that the item vended be maintained at a predetermined temperature as near continuously as possible from the time it is inserted into the vending machine until it is vended and especially at the time it is vended.

To meet the problem of foolproof operation and to increase vending capacities, conventional vending machines have become more complex. It appears that the point of diminishing return may have been reached in conventional design wherein the increased complexity of the vending apparatus necessary to vend larger quantities of articles would tend to decrease available space and storage capacity. It is a purpose of this invention to overcome this disadvantage and to provide a step forward in the vending machine art.

To these and other ends, this invention comprises apparatus for and a method of operation of a vending machine, a preferred form of which is disclosed in the following description and attached drawings.

In the drawings:

Fig. 8 is a partial elevation view of the rear of a vending machine according to this invention, with the rear insulating panel removed to show the vending mechanism with particularity.

Fig. 9 is a partial sectional view, taken along the line 9—9 of Fig. 8.

Fig. 10 is a sectional elevation view of a damping device according to this invention.

Fig. 11 is an enlarged section of a portion of the vending apparatus of this invention taken along the line 11—11 of Fig. 7.

Fig. 12 is a partially sectioned elevation view of the ratchet stop and lock mechanism of this invention taken along the line 12—12 of Fig. 7.

Fig. 13 is an elevation view of the ratchet stop and lock mechanism of the vending mechanism of this invention taken along the line 13—13 of Fig. 12.

Fig. 14 is a front elevation view of a portion of the vending machine of this invention showing the storage compartment with the vending chamber partitions removed and the rear panel of the bottle storage compartment partially broken away to disclose the cooling means and apparatus of this invention.

Fig. 15 is a partial sectional view taken along the line 15—15 of Fig. 7.

Fig. 16 is an enlarged section of the latch and stop slide mechanism of this invention with the stop slide in a different position from that shown in Fig. 11.

Fig. 18 is a diagrammatic elevation view of another embodiment of a single chamber of a storage and vending apparatus of this invention.

Fig. 19 is a partial sectional elevation view of a cam and latch mechanism of another embodiment of a vending apparatus of this invention.

General aspects of vending machine

Figure 1:
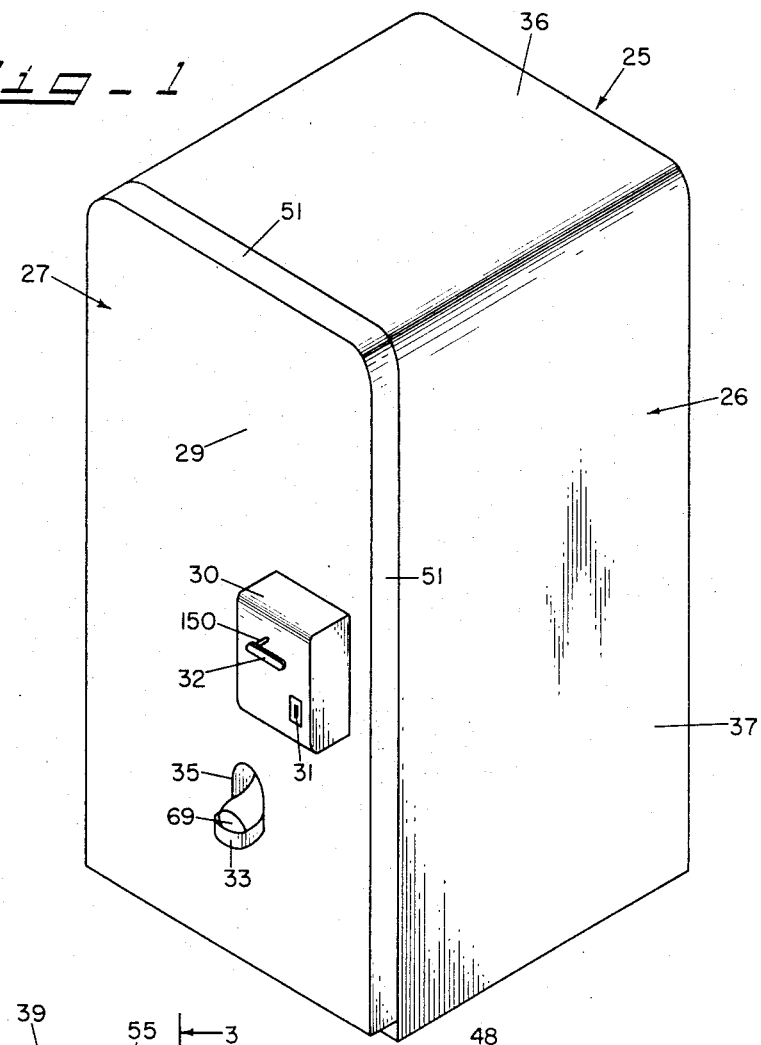
Fig. 1 is a perspective view of the front, right, and top sides of a vending machine of this invention.

Referring to Fig. 1, a vending machine, designated generally as 25, comprises a cabinet, designated generally as 26, and a door, designated generally as 27. The door 27 is adapted to open on hinges 28 and contains on its forward surface 29 an enclosure 30 for a coin receiving, evaluating, and latching mechanism. Provision is made in the enclosure 30 for a coin slot 31, wherein the vendee deposits his coin, and a protruding handle 32, which is operated by the vendee after inserting his coin to release and vend an article, for example a bottle. Although the method and apparatus hereinafter described in detail refer with particularity to the vending of bottled beverages, it is apparent that other cylindrical objects may be vended in the same or a similar method and apparatus.

A bottle vending receptacle 33 projects from the front surface 29 of the door 27 and is adapted to receive and hold a bottle 69 which is delivered therein through an aperture 35 in the door 27.

Figure 2:
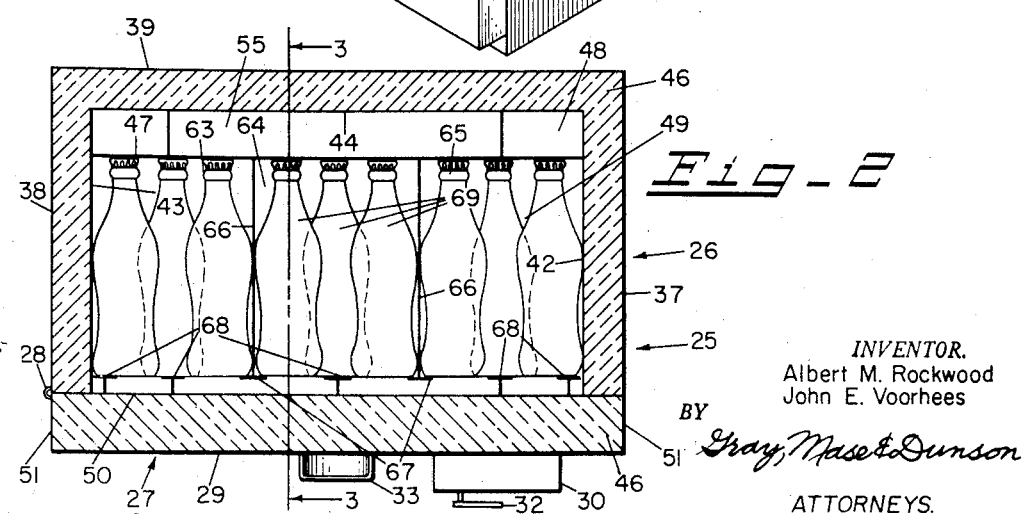
Fig. 2 is a sectional top view of a vending machine according to this invention, taken along the line 2—2 of Fig. 3.
Figure 3:
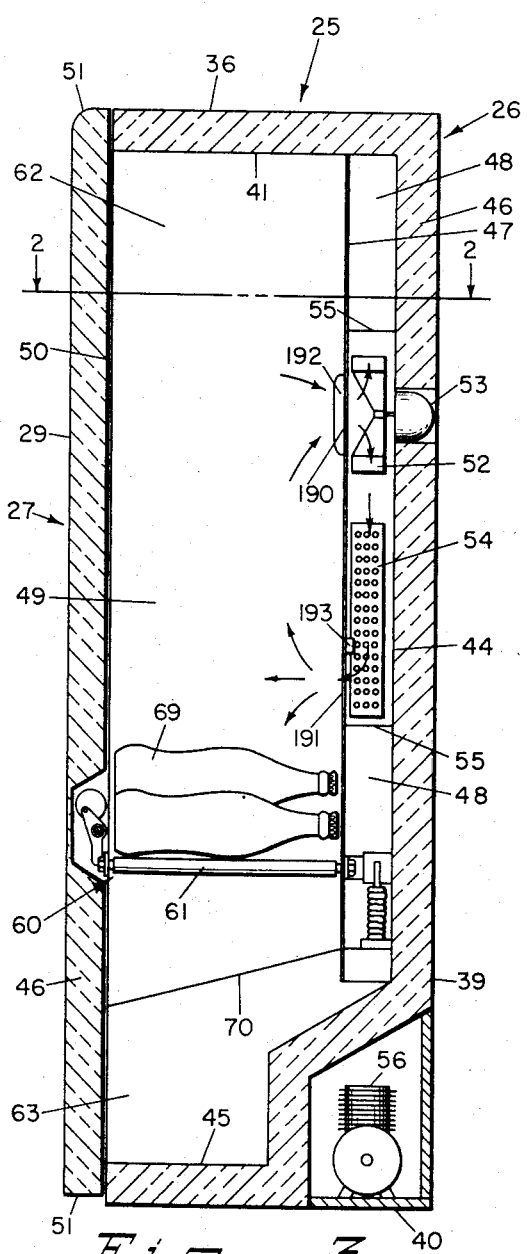
Fig. 3 is a sectional elevation view of a vending machine according to this invention, taken along the line 3—3 of Fig. 2.

As further appears in Figs. 2 and 3, the enclosure 26 comprises a generally rectangular unit having a top surface 36, right side surface 37, left side surface 38, rear surface 39, and bottom surface 40. Each surface, 36, 37, 38, 39, and 40, is respectively spaced from and parallel to an inner top wall 41, an inner right wall 42, an inner left wall 43, an inner rear wall 44, and an inner bottom wall 45 by an insulating material 46, such as fiber glass, rock wool, etc. The outer and inner surfaces are preferably of sheet metal although other suitable materials may be used.

A vertical panel 47 is disposed in the enclosure 26 parallel to and spaced from the inner rear wall 44. The panel 47 separates the enclosure into a cooling-equipment compartment 48 and a bottle storage compartment 49.

The cooling-equipment compartment 48 is enclosed by inner rear wall 44, inner right wall 42, inner left wall 43, panel 47, inner top wall 41, and inner bottom wall 45. The bottle storage compartment 49 is enclosed by the panel 47, the inner right wall 42, the inner left wall 43, the inner top wall 41, and the inner bottom wall 45, and a rear door surface 50 of the door 27.

Having a construction similar to the enclosure 26, the door 27 comprises the front surface 29 and the rear surface 50, separated by an insulating material 46, having an edge 51 around the periphery thereof and smoothly contoured in conjunction with the front surface 29 to form a pleasing appearance.

In the cooling equipment compartment 48 are located a fan 52 driven by a motor 53 and an evaporator 54, enclosed in suitable ducting 55. A refrigeration compressor 56 is located at the lower rear of the vending machine 25, outside of the insulated enclosure 26.

A bottle-dispensing mechanism designated generally as 60 is located in the bottle storage compartment 49. Horizontally disposed support members 61 divide the bottle storage compartment 49 into an upper portion 62 and a lower portion 63.

Bottle storage compartment

Referring to Figs. 4, 5, 6, and 7 in conjunction with Figs. 2 and 3, the upper portion 62 of the bottle storage compartment 49 is divided into adjacent vertical chambers 63, 64, and 65 by partition members 66. Each partition member 66 is provided with a vertical flange portion 67 disposed at right angles thereto. Fastened to the rear door surface 50 are similar vertical flange members 68. Bottles 69 are horizontally disposed in vertical stacks in each of the chambers 63, 64, and 65, in staggered interlocking relationship being restrained from longitudinal movement by panel 47 at one end and flanges 67 and 68 at the other end.

Three vertical stacks are shown in the chambers 63, 64, and 65 of the example vending machine 25 although more than this number may be provided, as will be later described. The lateral distance D, as seen in Fig. 4, between partitions 66 in chamber 64 or between a partition 66 and inner right wall 42 or inner left wall 43 of chambers 65 and 63, respectively, is constructed to be greater than twice the diameter of a bottle but less than three times the diameter of a bottle.

Figure 4:
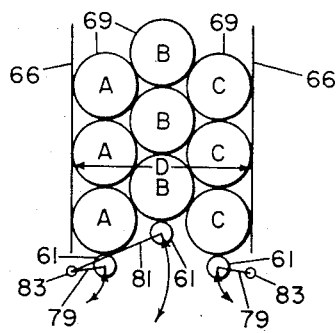
Fig. 4 is a diagrammatic elevation view of a single chamber of a storage and vending apparatus of this invention.
Figure 5:
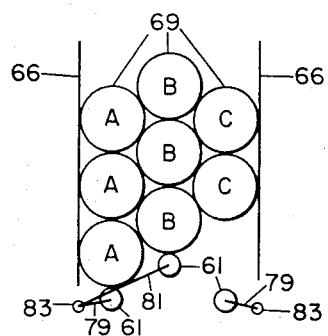
Fig. 5 is a diagrammatic elevation view of a single chamber of a storage and vending apparatus of this invention at a different point in the sequence of vending operation as that shown in Fig. 4.
Figure 6:
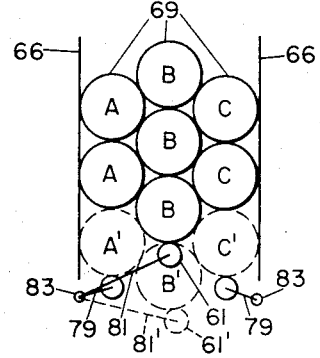
Fig. 6 is still another diagrammatic elevation view of a point in the sequence of operations that occur in one chamber of a storage and vending apparatus of this invention.

With the bottles so arranged in each chamber, individual bottles are stacked one upon another in three vertical stacks, the bottles in the right stack being designated C, the bottles in the middle stack being designated B, and the bottles in the left stack being designated A, for explanation purposes only, as seen in Figs. 4, 5, and 6. For optimum most foolproof operating conditions a distance D is preferred in construction that is equal to 2.732$d$ where $d$ is the bottle diameter, for the special condition of three vertical stacks as shown in the example vending machine 25. Under such conditions, each bottle is touching all those bottles immediately adjacent and the maximum number of bottles may be stored in each chamber and consequently in the bottle storage compartment 49. Further, when this arrangement is provided, the lowermost bottle 69 of stack B provides an effective key upon which are supported all of the other bottles in stacks A, B, and C of the chamber. Through the proper sequence of individual removal of the various lowermost bottles of stacks A, B, and C, all of the bottles in the chamber may be supported, and the stacking arrangement may be maintained, without loss of any bottles from any stacks or from the chamber. More than three vertical stacks of bottles may be provided in a vending machine chamber, as diagrammatically shown in Fig. 18. In this arrangement, the optimum spacing between partitions 66′ is equal to $(n-1).866d+d$, where $n$ is the number of vertical stacks and $d$ is the bottle diameter. While the equation given above provides the optimum and preferred spacing, the distance D′, for any particular number of stacks $n$, may be increased to a maximum slightly less than $n \times d$ and decreased to a minimum of $$\left(\frac{n}{2}+\frac{1}{2}\right)d$$

It will be apparent that bottle irregularities and random interaction between bottles in chambers providing for more than three stacks lessen the probabilities of foolproof operation unless a substantially optimum distance D′ (determined by the equation), is provided. Further, any deviation from the optimum (determined by the equation) decreases the storage capacity of the chamber.

Through the bottle storage and stacking arrangement described above, it has been found that considerably greater storage capacity, in terms of bottles in vending position, may be provided than that in conventional vending machines of which the applicants are aware.

Many machines in present use have storage arrangements which locate individual bottles in separate tubes or cells, or arrange the bottles in rows or columns in single file. The cells or tubes which contain the bottles are often arranged in a drum-like pattern or in an endless chain. The columns of bottles are arranged vertically with adjacent columns either forming a straight row or disposed about the circumference of a drum with the axes of the bottles lying on radial lines of the drum.

The chief disadvantage of most of the arrangements in the present use is the large volume occupied by the machine relative to the number of bottles contained in the machine. A cabinet of rectangular configuration is used in most cases and the machines which store bottles in any drum-type arrangement necessarily cause much space to be wasted in the corners of a rectangular cabinet. Also, the structure of the machine which separates the bottles, whether it be cells, tubes, or parallel sides of columns, causes much waste in space. The ideal arrangement from a space-saving standpoint would be to stack all the bottles in a single chamber much in the manner in which wood is corded, so that the adjacent rows of bottles interlock. The stacking ararngement herein described clearly approaches the ideal and at the same time utilizes an uncomplicated dispensing mechanism.

In the lower portion 63 of the bottle storage compartment 49 are stored bottles 69 for precooling. A chute 70 is provided beneath the bottle dispensing mechanism 60 to carry the individual bottles 69 to the receptacle 33 after being vended by the vending mechanism 60.

Figure 7:
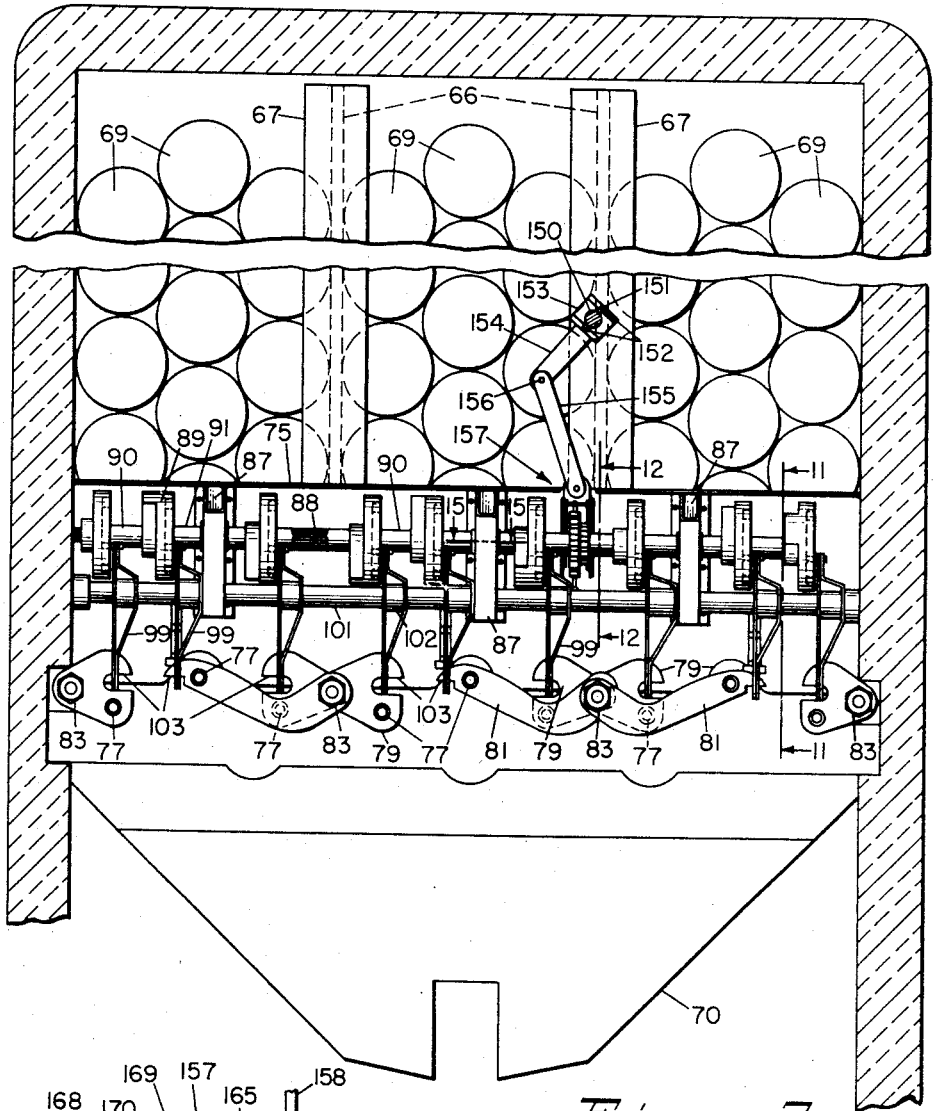
Fig. 7 is an elevation view of the front of a vending machine according to this invention with the door removed.

During the normal course of events and operations of the vending machine of this invention, an attendant opens the door 27 and places the bottles 69 in the chambers 63, 64, and 65 with the bottoms outward. Bottles may be readily inserted in the chambers due to the fact that upon opening the door 27 the flanges 68 move out of position with the door, as shown in Fig. 7. After the chambers 63, 64, and 65 have been completely filled the attendant fills the lower portion 63 of the bottle storage compartment 49 with bottles 69 below the chute 70. The attendant then closes the door and the vending machine is ready for operation.

When the attendant returns after a suitable period of time has elapsed, those bottles 69 in the lower portion 63, having been precooled, or moved up and placed on top of any bottles remaining in the chambers 63, 64, and 65. Any remaining space above these precooled bottles 69 is filled with warm bottles 69 and the lower portion 63 is filled again.

Vending mechanism

Referring to Figs. 7, 8, 9, 10, and 11, the vending mechanism 60 of this invention is supported by a front frame member 75 and a rear frame member 76 comprising transversely disposed vertical plates suitably fastened to inner left wall 43 and inner right wall 42 at each end. These plates 75 and 76 form the lower prolongation of panel 47 and guide flanges 67 and 68, respectively, and serve to longitudinally position the bottles 69 over the support members 61 when the bottles 69 are in the final position before vending.

The support members 61 comprise hollow tubing members 77 of relatively hard materials, such as metal, encased by a resilient tubing member 78 of relatively soft material, such as rubber or plastic. The bottles 69 rest on the resilient tubing 78 which prevents breakage and abrasion of the bottle surfaces. Each stack A, B, and C of bottles 69 in each chamber 63, 64, and 65 has a support member 61 centrally located beneath the lowermost bottle.

Those support members 61 supporting left and right stacks A and C, respectively, are supported at the forward end, by a short lever 79. At the rear ends these support members 61 are supported by short levers 80.

The support members 61 supporting the center stacks B are fastened at the forward end to long levers 81 and at the rear ends by long levers 82. The levers 79 and 80 or 81 and 82 carrying each support member 61 are rotatably journaled on a common shaft 83.

In the vending machine 25 of the example, there are four shafts 83 extending between plates 75 and 76 and projecting to the front and rear thereof, respectively. On projections 84 of each shaft are located the levers 79, 80, 81, and 82. The levers 79, 80, 81, and 82 are spaced relative to each other by spacers 85 and retained in assembly by nuts 86 threaded on the shafts 83.

On the forward vertical face of plate 75 are fastened bearing members 87. The bearing members 87 rotatably support a splined shaft 88. At spaced intervals along the shaft 88 are disposed generally disk-shaped internal cams 89. The cams 89 are provided with centrally located apertures adapted to mate with the splines of shaft 88 in interlocking relationship preventing rotation between cams 89 and shaft 88. A tubular cover 90 is provided on the shaft 88 between adjacent cams 89. A section 91 of the tubular cover 90 between those cams 89 that are disposed on oppoiste sides of a bearing member 87, provides a cylindrical surface 92 that is rotatably journaled in a bearing 93 of bearing member 87, as shown in Fig. 15.

One side face of each cam 89 is provided with a groove 92 having a circular configuration about the longitudinal axis of the shaft 88 for the major portion of its closed path. For a minor portion of its path, the groove 92 is provided with a depression 93 toward the center of rotation of cam 89. At its forward edge 94, the depression 93 is steeply sloped toward the center of rotation. Thereafter it progresses into a trailing edge 95 of moderate slope.

The groove 92 is substantially rectangular in cross section and is adapted to receive a cam-following roller 96. Roller 96 is rotatably journaled on one end of a follower shaft 97.

The follower shaft 97 is fastened at the opposite end in an upper arm 98 of a latch member 99. The latch member 99 is provided with a lower arm 100 and is rotatably supported on a latch shaft 101 by means of a bearing 102.

In the bottle dispensing mechanism 60 of the example, each latch member 99 comprises a composite body portion comprising multiple stamped plate sections spot welded together at the extremities of the upper and lower arms 98 and 100. At the central portion the stamped plate sections are spaced from one another to provide stability about the longitudinal axis of the latch shaft 101. The bearing 102 is located between the adjacent plate sections of each latch member 99.

The latch shaft 101 extends longitudinally from one side of the dispensing mechanism 60 to the other. The bearing members 87 are provided with holes to receive and support the latch shaft 101 at spaced intervals along its length.

The lower arm 100 of each latch member 99 is provided with a detent 105 projecting from the side thereof and having a slightly inclined edge 106. Each of short levers 79 and long levers 81 is provided with a catch 103; which, when the support member 61 is in the raised bottle-supporting position, is engaged by the detent 105.

Referring to Figs. 8 and 9, each of short levers 80 at the rear of the dispensing mechanism 60 is engaged at one end near the top edge 107 by a tension spring 108 which is attached at the opposite end to a projection 109 pressed from plate 76. Each spring 108 is provided with a housing 110 formed of suitable sheet material, and adapted to cover the upper end and sides. The housing 110 is fastened to the plate 76 by spot welding or other suitable means.

Each long lever 82 is provided with a counterbalance weight 111 fastened by suitable means such as screws 112 to an arm 113. A weight arm 113 forms one side of the long lever 82. The weight arm 113 is oppositely disposed to a support member arm 114. A damping device, designated generally as 115, is connected to the support roller arm 114 by a clevis 116 and pin 117.

Each weight 111 is provided with a vertical slot 118 which is open at the bottom to allow for the nestling and operation of the long lever 82 that is oppositely disposed on the same shaft 83. Each weight 111 is provided in addition with a vertical semicircular groove 119 to allow for the nestling and interaction of the clevis 116 and pin 117 of the damping device 115 of the oppositely disposed long lever 82.

In the normal stationary position of the dispensing mechanism 60, between vending operations, all support members 61 are in the position shown diagrammatically in Fig. 4, and are latched in this position by the engagement of a detent 105 in a catch 103. After each loading of the vending machine 25 by an attendant, all chambers 63, 64, and 65 are completely filled at the dispensing mechanism 60, as shown in Fig. 4. When the first coin is deposited in the machine 25, the splined shaft 88 is rotated $1/n$ of a complete rotation ($n$ being equal to the number of cams 89 on the shaft 88). The configuration of the groove 92 of each cam is provided so that this amount of rotation will cause the roller 96 in only one cam 89 to arrive at and pass into the depression 93. The cams 89 are disposed on the shaft 88 in individually offset angular position so that the individual depression 93 of each cam 89 is offset $1/n$ of one rotation from all other cams 89 on the shaft 88.

In the example vending machine 25, nine stacks of bottles 69 and nine cams 89 are provided. Each cam 89 has groove 92 that is circular for about 270 degrees and has a depression for about 90 degrees. Each cam 89 is disposed on the shaft 88 with a depression 93 positioned forty degrees offset from all of the cams on the shaft.

When the roller 96 moves into the depression 93 of the cam 89 that has been brought into position by the first vending operation, the weight of the bottles 69 in an outside stack C forces the latch member 99 to rotate clockwise (as seen in Fig. 11) on the latch shaft 101. In this operation, the lowermost bottle 69 presses on the support member 61, forcing the catch 103 against the inclined edge 106 of the detent 105 which provides a rotational moment on the catch member 99. This moment forces the roller 96 into the depression 93 and allows the detent 105 to become disengaged from the catch 103 releasing the support member 61. The rollers 96 of all other cams 89 that control a support member 61 which is supporting a bottle 69, remain engaged in the circular portion of their respective grooves 92 during this operation, and therefore only one support member 61 is released.

As shown diagrammatically in Figs. 4, 5, and 6, and, by way of example, selecting the lowermost bottle of stack C as the first bottle to be vended, release of the catch 103 allows the short lever 79 to rotate counterclockwise about the shaft 83. This lowermost bottle 69 of stack C forces the short lever 79 to rotate far enough to release the bottle into the chute 70. Upon striking the chute 70, the bottle slides into the receptacle 33 where it may be obtained by the vendee. After the bottle 69, from stack C, has been released, the spring 108, at the rear of the vending mechanism 60, which has been stretched under tension by the downward movement of short lever 80 during the vending operation, returns the short lever 80, support member 61, and short lever 79 to the raised position shown in Fig. 4. The detent 105 engages the catch 103 during the second following rotational increment of the cam 89.

As shown in Fig. 11, the latch member 99 is provided with a projecting lug 120. A stop slide 121, comprising vertically extending slide portions 122 formed integrally with a protruding U-shaped central portion 123, is adapted to slide vertically on the plate member 75. The stop slide 121 is held in operational position by formed lugs 124 welded to the surface of plate 75.

When the support member 61 is in the raised latched position, the tube 77 engages the lower end of the stop slide 121. This holds the stop slide 121 in the position shown in Fig. 11.

When the support member 61 is depressed during the vending operation, the stop slide 121 slides by gravity downward to the position shown in Fig. 16. If for any reason the support member 61 does not return to the raised position after vending a bottle 69, the projecting lug 120 will engage the central portion 123 of the stop slide 121, during the second following rotation of the cam 89, as shown in Fig. 16. In this manner the roller 96 will be prevented from climbing the trailing edge 95 into the circular portion of the groove 92, and the vending mechanism 60 will be jammed. When the mechanism becomes thus jammed, the attendant may be notified and necessary corrective measures taken.

In the vending mechanism 60 of this invention and the stacking arrangement to which it is applied, the failure of a support member 61 to return to the raised position would result in the complete collapse of all the stacks A, B, and C in any one chamber 63, 64, or 65, allowing all the bottles in that chamber to fall into the chute 70 after a second support member 61 of that chamber was released. The stop slide 121 and its operation effectively prevents this eventuality.

After the lowermost bottle in stack C has been vended, the remaining bottles in the chamber are positioned as shown in Fig. 5. Upon the insertion of a coin, the second vending operation takes place. As in the first vending operation, the cam 89 rotates 1/n of a complete revolution, and the latch member 99 which restrains the support member 61 under the lowermost bottle of stack A, is retracted. The lowermost bottle 69 of stack A is released in the same manner as in the first vending operation, and the support member 61 returns to its latched position, as shown in Fig. 6. After the second vending operation, all of the bottles in stacks A, B, and C are held in position by the interlocking effect of the stacking arrangement and are supported by the lowermost bottle 69 of the central stack B, which in turn is supported by the support member 61 thereunder.

When the third coin is inserted in the vending machine 25 and the cams advance, as previously described, the central support member 61 is released. The weight of all the bottles in stacks A, B, and C forces the support member 61 down. During the downward progress of support member 61, its speed is checked and controlled by the damping device 115, which is attached to the long lever 82 at the rear of the vending mechanism 60. In this manner, all the bottles in the chamber are slowly lowered until the lowermost bottles in stacks A, B, and C have reached the position designated A', B', C', in Fig. 6. At this position, the lowermost bottles of stacks A and C engage the left and right support members 61 and are held thereby. At this position, the central support member 61 has reached the position designated 61' and the long lever 81 has reached the position 81', as shown in Fig. 6. The weight of the lowermost bottle in central stack B carries the central support member 61 further downward past the position 61', until this lowermost bottle is released into the chute 70 and vended through the receptacle 33. After the lowermost bottle of the central stack B has been released, support member 61 returns to its raised position, and the vending cycle of one bottle from each of stacks A, B, and C in the chamber is complete. The order of vending from stacks A, B, and C may be predetermined by proper relative positioning of the cam 89 on the cam shaft 88. Any order may be selected and bottles may be vended from alternate chambers 63, 64, or 65 so long as the lowermost bottle of both outside stacks is vended prior to the lowermost bottle of the central stack.

Referring to Figs. 18 and 19, another embodiment of the vending mechanism is shown providing for vending operations from a chamber 200 having four vertical stacks of bottles, designated from right to left, R, S, T, and U, respectively. In general construction respects, the previously described embodiment and this embodiment are the same. In a manner similar to the first described embodiment, the stacks R, S, T, and U are supported by support members 201. The support members 201 under stacks R and U are carried by swingable short levers 202, and the support members 201 under stacks S and T are carried by swingable long levers 203.

One of the stacks S or U, as an example stack S, is supported by a support member 201 that is controlled by a latch member 204 and cam 205 which are different in two respects from the latch members 99 and cams 89. The other stacks R, T, and U are controlled in the same manner and with the same mechanism as that of the first-described embodiment, shown in Figs. 7 and 9.

In this second embodiment, the latch member 204 is provided with a projecting detent 206 and a further projecting lower detent 207. In other respects the latch members 99 and 204 are the same. Latch member 99 is provided with a cam follower roller 214.

In this second embodiment the cam 205 is provided with a groove 208 having a first circular portion 209, a first depression 210, a second circular portion 211, a second depression 212, and a portion of gradual ascension 213. In other respects the cam 89 and 205 are the same.

In the operation of the vending mechanism of this second embodiment, the lowermost bottles 69 in the stacks R and T are vended in the manner previously described for the first embodiment and during the first and second vending operation.

When the third vending operation takes place and the splined shaft 88 is rotated, the cam 205 turns to allow the roller 214 to move through the first depression 210 and into the second circular portion 211. The latch member 204 is rotated clockwise thereby, enough for the detent 206 to release long lever 203 and support member 201 under stack S.

At the same time the support member 201 under stack U is released through the action of a "one-step" cam 89 by which it is controlled.

At the position of impending release for the lowermost bottles 69 in stacks S and U, the positions R' and T', as shown in Fig. 18, are empty.

When the support members 201 under stacks S and U simultaneously release, all of the stacks R, S, T, and U are released and all of the bottles 69 in the chamber 200 descend. The rate of descent is controlled by a damping device 115 at the rear of the vending mechanism 60, as previously described. All stacks descend until the lowermost bottle 69 in each stack R, S, T, and U have reached the positions R', S', T', and U', respectively, where stacks R' and T' are again supported from beneath by support members 201. The long lever 203, supporting stack S, engages the detent 207 of latch member 204, and the lowermost bottle 69 in stack S is held in the position S'. The weight of the lower bottle 69 in stack T carries the support member 201 past the position U' and downward until released into the chute 70 and vended in the receptacle 33.

When the fourth vending operation takes place, the cam 205 is rotated, and the roller 214 moves through the second depression 212, further rotating the latch member 204 clockwise. This rotation disengages the detent 207 from beneath the long lever 203, whereby the lower bottle in stack S is vended from position S'. The release of the bottle from position S', completes the four-bottle vending cycle for the chamber 200, and bottles 69 are in position for the beginning of another cycle.

It is apparent that a vending mechanism for more than four stacks may be provided by construction similar to that described with particularity for three- and four-stack chambers.

Certain conventional dispensing mechanisms now in use employ a system of operation whereby the bottles are released from various stations on the machine, and wherein the mechanism at successive stations gradually approaches the point of releasing a bottle. In a mechanism of this type, the number of stations must be relatively few to prevent variations in the bottles or the mechanism from causing the premature release of a bottle at some dispensing station. Such a vending apparatus is shown in Patent 2,585,012. In the mechanism of that patent, the cylindrical objects in one of the stacks are half released at all times. Increasing the number of stacks and the vending capacity of the machine herein shown would require that the point of release be approached even closer than the one-half position shown.

Because of the unique disk-type side cam mechanism operating the positive-acting latch and detent device in the vending mechanism of this invention, bottles are dispensed upon a sudden release of the latch. The condition of release of the latch occurs only during a very short angular rotation of the cam, so that a relatively large number of dispensing stations could be used without the danger of premature release of a bottle. It is apparent that by increasing the diameter of the disk cams and the diameter of the circular portion of the cam grooves, the number of dispensing stations may be increased without decreasing the travel distance of the cam follower rollers during a single vending operation. In conjunction therewith, the number of cams and vending stations may be increased, without approaching the point of release of any bottle in the machine any closer than that in the described embodiments.

In addition, the mechanism is easily operated. In a fully loaded vending machine, wherein all of the bottles to be vended are moved toward the vending position by power means such as a conveyor and motor, the power requirements are high. In the vending of this invention, the only power required is the rotation of the cam shaft, in contrast to physically moving any of the bottles in the machine.

The mechanism is inexpensive to manufacture requiring very few parts that require accurate machine work.

Further, dispensing machines in a wide range of sizes may be built using the same basic unit singly or in multiple.

*Damping device*

Referring to Fig. 10, the damping device 115 of this invention comprises in general a cylinder 130, a piston 131 adapted to reciprocate in the cylinder 130, the piston rod 132 threaded at one end in the piston 131, and a clevis 116 threaded on the opposite end of the piston rod 132.

The cylinder 130 is provided with external lugs 133, at one side, which are fastened to the plate 76 by means of machine screws 134. The cylinder 130 has an internal bore 135 and is externally threaded at its upper end 136 to receive a cap 137. The cap 137 is provided with an open bore 138. The bore 138 has an internal diameter significantly larger than the diameter of the piston rod 132 to allow the central axis of the piston 132 to deviate from the longitudinal axis of the bore 135. A gasket 139 is provided between the cap 137 and the upper end 136 of the cylinder 130.

The piston 131 has a spherically contoured periphery 140, the diameter of which is slightly smaller than the bore 135 of the cylinder 130. The difference in diameters between the bore 135 and the periphery 140 is predetermined to allow a fluid 141, contained in the cylinder 130, to flow past the periphery 140 at a predetermined slow rate during the downward stroke of the piston 131. Ball check valves 142 are provided in the piston 131, and are arranged to close on the downward stroke of the piston 131. The piston 131 is fastened to the piston rod 132 by a threaded engagement means 143.

The clevis 116 is fastened to the piston rod 132 by a threaded engagement means 144. A resilient accordion-type boot 145 having elastic snap rings 146 at each end, formed integrally therewith, is provided between the cap 137 and the clevis 116 to prevent foreign matter from entering the bore 138.

As previously described, when the support member 61 of a central stack B is released during the vending operation, the weight of the bottles 69 depresses the support member 61. This causes the long lever 82 to rotate downward about the shaft 83. As the long lever 82 descends, the damping device 115 resists, controls, and slows its downward travel. Thru the pin 117, clevis 116, piston rod 132, and piston 131 the force of the weight of the bottles 69 is transmitted to the fluid 141 which escapes gradually past the periphery 140 of the piston 131. The ball check valves 142 are closed by the pressure of the fluid during the descent of the piston 131. After the lowermost bottle 69 of the central stack B has been released, the counterweight 111 rotates the long lever 82 in the opposite direction raising the piston 131 in the cylinder 130. During the upward travel of the piston 131, the ball check valves 142 are open allowing the rapid passage of fluid and the unchecked ascent of the piston 131.

As seen in Fig. 8, the movement of the pin 117 connecting the clevis 116 with the long lever 82 is arcuate about the shaft 83. The arcuate movement of the pin 117 is permitted by the spherical contour of the periphery 140 of the piston 131.

The provision of a suitable damping device in combination with the bottle dispensing mechanism 60 of this invention is attendant with many difficulties. These difficulties are the result of two variables found especially in vending machine operations.

The first variable is the wide range of temperatures that may be expected to exist in the vending machine. The second variable is the wide range in the number of bottles, and the consequent variable weight on a central support member 61, existing during vending operations from a full chamber to an empty chamber.

The damping device 115 must control the downward motion of the support roller 61 in a temperature range from 80° F. to 30° F., and at the same time, whether loaded with forty bottles or four bottles. The damping device 115 of this invention is capable of operating under these conditions because the spherical periphery 140 of the piston 131 allows the piston rod 132 to deviate angularly which eliminates additional linkages with resulting less friction. Further, the use of the total peripheral clearance between the piston 131 and the cylinder 130 as an orifice provides lubrication for the piston.

Although a damping device 115 for each long lever 82 is preferred, since only one of the long levers 82 operates at one time, only one damping device 115 is necessary if a suitable linkage is provided between the long levers 82 and the one damping device 115.

*Ratchet stop and lock mechanism*

Referring to Figs. 1 and 7, the handle 32 is fastened to a shaft 150 that projects through the housing 30 and the door 27 into the bottle storage compartment 49. At the inner end, the shaft 150 is provided with oppositely disposed laterally projecting lugs 151 adapted to meet with slots 152 of a rotatable crank member 153 mounted on the flange 67. The shaft 150 is provided with means (not shown) for locking until a suitable coin has been inserted into the coin slot 31. The crank member 153 is formed with an integral side arm 154 which is connected at one end to a link member 155 by a pin connection 156. At the opposite end the link member 155 is connected to a ratchet stop and lock mechanism designated generally as 157.

In the ratchet stop and lock mechanism 157, a pawl carrier body member 158 is fastened at one end 159 to the link member 155 by a pin connection 160. The body member 158 is adapted to slide vertically on the plate 75, retained in position by guide pins 161 and washers 162 which are connected to the plate 75. Slots 163 are provided in the body member 158 to allow for vertical movement. The body member 158 is formed with opposite side portions 164 perpendicular to the base thereof. Inwardly adjacent to each side 164 and rotatably connected thereto at one end by a pin 165, are rotatable pawl links 166. At their opposite ends the pawl links 166 are connected at opposite ends of a pawl 167. The pawl 167 is in the form of a circular rod. A ratchet 168 having teeth 169 is positioned between the pawl links 166 and is centrally positioned on the splined shaft 88 by engagement of the splines thereof. The right side 164 is provided near the top with a projection 171 having an ear 170. The side 164 further provided near the bottom with a projection 172 having a protrusion 173. A torsion spring 174 is positioned on the pin 165 having one end 175 engaged behind a link 166 and the other end 176 in contact with the body member 158.

A sprocket 178 having radially inward concave recesses 179, of a number equal to the number of teeth 169 on the ratchet 168, is machined in the hub of the ratchet 168.

After a coin has been inserted in the coin slot and the shaft locking mechanism (not shown) is activated thereby, the shaft 150 is released. In order to complete the vending operation, the vendee turns the handle 32, rotating the shaft 150. Rotation of the shaft 150 rotates the crank member 153 by means of the lugs 151 engaged in the slots 152. The rotation of the crank member 153 slides the body member 158 upward by means of the link member 155. Upward movement of the body member 158 rotates the ratchet 168 and the shaft 88 by means of the engagement of pawl 167 in the teeth 169. The pawl 167 is held in engagement with the teeth 169 of the ratchet 168 by the pawl links 166 which are urged by the spring 174.

As the pawl carrier body member 158 moves upward rotating the ratchet 168 by means of the pawl 167, the protrusion 173 enters and engages a recess 179 on the side of the sprocket 178. The engagement of the protrusion 173 in the groove 179 effectively locks the ratchet against further rotation in either direction at the end of the upward stroke.

Figure 17:
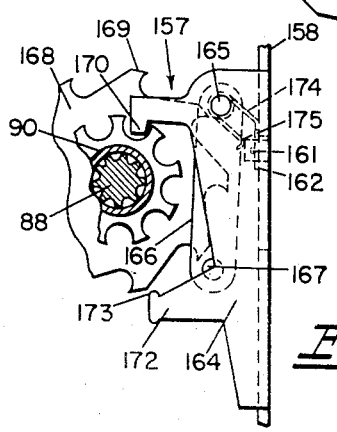
Fig. 17 is an elevation view of a portion of ratchet stop and lock mechanism with the pawl carrier body member at a different position from that shown in Fig. 12.

When the handle 32 is released, it is returned to its normal horizontal position by spring means (not shown) and the pawl carrier body member 158 slides downward. During the downward travel of the pawl carrier body member 158, the protrusion 173 disengages from the recess 179 and the ear 170 engages a recess 179 of the sprocket 178 preventing rotation of the ratchet in either direction, as shown in Fig. 17.

When the pawl carrier body member 158 reaches the lower position of its downward travel, the pawl 167 engages the next tooth 169 of the ratchet 168 and the cycle of operation of the ratchet stop and lock mechanism 157 is complete.

It is apparent that the ratchet stop and lock mechanism 157 of this invention provides an actuator for shaft 88 and the consequent operation of the bottle dispensing mechanism 60 that is positively locked against untimely rotation in either direction, caused by forces external to the proper vending operations.

*Refrigeration apparatus and method of operation*

Referring to Figs. 3 and 14, the panel 47 which separates the cooling equipment compartment 48 from the bottle storage compartment 49 is provided with intake apertures 190 in front of the fan 52. Outlet apertures 191 are provided in front of and at the lower end of the evaporator 54. An aperture 191 is provided for each of the bottle storage chambers 63, 64, and 65, three being shown in the vending machine 25 of the example. Apertures in the form of slots 192 are provided along the rear edge of the partitions 66. The motor 53 is of a type capable of operation at more than one speed, for example two speeds, high and low, and is controlled by a temperature responsive switch means 193 fastened to the back of panel 47 adjacent the outlet aperture 191.

During the normal operation of the vending machine 25 the fan motor 53 operates at high speed and air is circulated as shown by the arrows in Fig. 3 into the fan 52 from the bottle storage compartment 49. By the action of the fan the air is propelled through the upper convolute portion of the ducting 55, downward across the evaporator 54 where it is cooled, into the bottle storage compartment 49 through the outlet apertures 191, progressing across the lower bottles in the chambers 63, 64, and 65, and upward to reenter the fan through apertures 190. Air passing upward in the left and right chambers 63 and 65, respectively, passes through the slots 192 before entering the intake apertures 190. The temperature responsive switch means 193 operates to continue the operation of the fan 52 at high speed so long as the temperature of the air leaving the evaporator is substantially the same as the desirable predetermined temperature of bottles to be vended. Whenever conditions exist such that the temperature of the air leaving the evaporator becomes excessively high, the switch means 193 operates to reduce the speed of the fan 52 to a second lower speed tending to reduce the temperature of the air leaving the evaporator.

In the bottle storage arrangement of the vending machine 25 of this invention wherin the bottles are vended from the bottom of vertically disposed stacks, it will be apparent that the lowermost bottles should be maintained at the desired predetermined vending temperature as much of the time as possible. By operation of the cooling equipment by the method of this invention wherein the fan is operated at more than one speed being controlled by the temperature of the air leaving the evaporator and passing directly to the bottles next to be vended, it is possible to produce that constancy of bottle vending temperature that is desired.

The advantage of this method of operation may be most readily appreciated when consideration is given to the situation in which the upper two thirds of chambers 63, 64, and 65 of the vending machine 25 have just been loaded by an attendant with warm unrefrigerated bottles of a temperature of 80° F. These warm bottles have been placed above those bottles in the lower one third of chambers 63, 64, and 65 that were in the chambers prior to the loading by the attendant, and which are at the proper vending temperature of 38° F. In such a situation, the air leaving the evaporator circulates across the refrigerated bottles and upward across the warm bottles where it is heated, returning across the evaporator. It being considered uneconomical to provide an evaporator of sufficient capacity to cool this warm air to a temperature of 38° F. with the fan at high speed, the air leaving the evaporator would rise to a temperature higher than 38° F. and would warm the previously refrigerated bottles in the vending position, thereby. In the method of this invention the temperature responsive switch means 193 senses the rise in air temperature leaving the evaporator and reduces the speed of the fan preventing the bottles in the vending position from being warmed.

It will be apparent that while two-speed fan operation is preferred in this method, more than two speeds may be used if closer air temperature control of the air leaving the evaporator is desired.

It will be understood, of course, that while the forms of the invention herein shown and described constitute preferred embodiments of the invention, it is not intended herein to illustrate all of the possible equivalent forms or ramifications of the invention. It will also be understood that the words used are words of description rather than of limitation, and that various changes, such as changes in shape, relative size, and arrangement of parts, may be substituted without departing from the spirit or scope of the invention herein disclosed.

What is claimed is:

1. In a machine for dispensing substantially cylindrical articles, storage means to laterally support said articles in at least three parallel interlocking stacks; release means for said articles having support members for said stacks adapted to swing away from and release said articles in said stacks; latch means normally engaging and holding said support members in supporting position; cam means rotatably operable to sequentially actuate said latch means to disengage from said support members and permit said support members to swing away from and release said articles, one at a time; damping means to control the swing of at least one of said support members; and ratchet stop and lock means operable intermittently to rotate said cam means a portion of a revolution, and to stop and lock said cam means against rotation between said intermittent rotations.

2. In a machine for dispensing substantially cylindrical articles, storage means to laterally support said articles with their longitudinal axes substantially horizontal, in at least three parallel interlocking stacks; release means for said articles having support members for said stacks adapted to swing away and release said articles in said stacks; latch means normally engaging and holding said support members in supporting position; cam means rotatably operable to sequentially actuate said latch means to disengage from said support members and permit said support members to swing away from and release said articles, one at a time; and damping means to control the swing of at least one of said support members.

3. In a machine for dispensing substantially cylindrical articles, storage means to laterally support said articles disposed with their longitudinal axes horizontal, in at least three parallel interlocking stacks; release means for said articles having support members beneath said stacks adapted to swing from beneath and release the lowermost article in each said stack; latch means normally engaging and holding said support members beneath said stack; cam means rotatably operable to sequentially actuate said latch means to disengage from said support members and permit said support members to swing from beneath said lowermost articles one at a time; and ratchet stop and lock means operable intermittently to rotate said cam means a portion of a revolution, and to stop and lock said cam means against rotation between said intermittent rotations.

4. In a machine for sequentially dispensing substantially cylindrical articles, release means for said articles having support members for a plurality of said articles; latch means normally engaging and holding said support members in supporting position; cam means rotatably operable to sequentially actuate said latch means to disengage from said support members and permit said support members to swing away and release said articles, one at a time; damping means to control the swing of at least one of said support members; and ratchet stop and lock means operable intermittently to rotate said cam means and to stop and lock said cam means against rotation between said intermittent rotations.

5. In a vending machine for dispensing substantially cylindrical articles having a frame, a plurality of said articles disposed in parallel interlocking stacks between a pair of substantially parallel article supporting walls connected to said frame and spaced apart a predetermined distance less than $n \times d$ and more than $$\left(\frac{n}{2}+\frac{1}{2}\right)d$$

where $n$ is the number of said stacks and $d$ is the diameter of said articles, a sequential release mechanism comprising: a swingable article retention member having arms rotatably supported on said frame; a rotatable latch member normally engaging said retention member; a cam rotatably supported by said frame, adapted to rotate said latch member to disengage said retention member; and actuator means to rotate said cam.

6. In a vending machine according to claim 5, wherein said actuator means comprises: a toothed ratchet rotatably supported on said frame, fixedly connected to said cam, and having recesses formed therein; a body member slidable in opposite directions and supported by said frame, having a projection at each end, said projections being alternately engageable with one of said recesses upon alternate sliding movement of said body member; link means rotatably connected to said body member; and a pawl connected to said link means, adapted to engage one tooth of said toothed ratchet during sliding movement of said body member in one direction, to rotate said ratchet thereby, and to disengage from said one tooth and move to another tooth of said toothed ratchet during sliding movement by said body member in the opposite direction.

7. In a vending machine according to claim 5, a damping device to control said article retention member comprising: a cylinder containing a fluid; a piston having a spherical periphery, reciprocable in said cylinder with slight clearance; a piston rod fastened to said piston at one end and connected to said article retention member at the opposite end; and check valve means in said piston.

8. In a vending machine according to claim 7, wherein said actuator means comprises a toothed ratchet rotatably supported on said frame, fixedly connected to said cam, and having recesses formed therein; a body member slidable in opposite directions and supported by said frame, having a projection at each end, said projections being alternately engageable with one of said recesses upon alternate sliding movement of said body member; link means rotatably connected to said body member; and a pawl connected to said link means, adapted to engage one tooth of said toothed ratchet during sliding movement of said body member in one direction, to rotate said ratchet thereby, and to disengage from said one tooth and move to another tooth of said toothed ratchet during sliding movement by said body member in the opposite direction.

9. Vending machine storage and vending apparatus for dispensing substantially cylindrical articles from vertical stacks, comprising: a pair of substantially vertical supporting walls spaced apart a predetermined distance substantially equal to $(n-1).866d+d$, where $n$ is the number of said vertical stacks and $d$ is the diameter of said cylindrical articles; a frame fastened beneath said vertical walls; swingable article retention members rotatably supported on said frame; a rotatable latch member normally engaging each retention member; a cam rotatably supported by said frame, adapted to rotate each latch member to disengage said retention member; actuator means to rotate each cam; and a plurality of said articles disposed in vertical interlocking stacks between said walls with one of said article retention members disposed beneath each of said vertical stacks.

10. In a vending machine for dispensing substantially cylindrical articles, a pair of substantially parallel supporting walls spaced apart a distance greater than the diameter of two of said articles but less than the diameter of three of said articles, a plurality of said articles stacked horizontally between said walls in interlocking relationship in three substantially parallel stacks, and a sequential release mechanism comprising: a frame beneath said supporting walls; a swingable article retention member for each stack, having arms rotatably supported on said frame with catch means on at least one of said arms; a latch member for each of said retention members, rotatably supported by said frame and normally engaging said catch means, and having cam follower means; a disk cam for each of said latch members, rotatably supported by said frame, having grooves in the side thereof, and keyed on a common shaft supported by said frame, positioned to receive said cam follower means in said groove and to actuate said latch member; actuator means to rotate said common shaft and said cams in unison a portion of a revolution to disengage one of said latch means to release one of said articles from one of said stacks; and return means to return said catch means to its normally engaged position.

11. In a vending machine for dispensing and sequentially releasing substantially cylindrical articles; a frame; a pair of substantially vertical article supporting walls spaced apart a predetermined distance substantially equal to 2.732$d$, where $d$ is the diameter of said cylindrical articles, and a plurality of said articles stacked with their longitudinal axes horizontal between said walls in interlocking relationship in three substantially vertical stacks; a swingable article retention member beneath each stack, having arms rotatably supported on said frame with catch means on at least one of said arms; a latch member for each of said retention members rotatably supported by said frame and normally engaging said catch means, and having cam follower means; a disk cam for each of said latch members rotatably supported by said frame, having grooves in the side thereof, and keyed on a common shaft supported by said frame, positioned to receive said cam follower means in said groove to actuate said latch member; actuator means to rotate said common shaft and said cams in unison; a portion of a revolution to disengage one of said latch means to release one of said articles from one of said stacks; return means to return said catch means to its normally engaged position; and a damping device connected to said frame comprising a substantially vertical cylinder open at one end and containing a fluid; a piston having a spherical periphery, reciprocal in said cylinder with slight pressure; a piston rod fastened to said piston at one end, positioned in said one open end of said cylinder with substantial clearance, and fastened to one of said article retention member arms at the opposite end; check valve means in said piston adapted to open upon reciprocation of said piston in one direction and to close upon reciprocation of said piston in the opposite direction; and a collapsible casing member encircling said piston rod connected to said open end of said cylinder at one end and to said piston rod at the opposite end.

12. A sequential release mechanism comprising: a frame; a swingable article retention member having arms rotatably supported on said frame; a rotatable latch member normally engaging said retention member; a cam rotatably supported by said frame adapted to rotate said latch member to disengage said retention member; actuator means to rotate said cam, wherein said article retention member is controlled by a damping device having a cylinder containing fluid, a piston having a spherical periphery reciprocable in said cylinder with a slight clearance, a piston rod fastened to said piston at one end and connected to said article retention member at the opposite end, and check valve means in said piston.

13. A sequential release mechanism for a vending machine adapted to vend cylindrical articles disposed with their longitudinal axes horizontal and in a plurality of interlocking stacks, comprising: a frame; a swingable article retention member for each stack, having arms rotatably supported on said frame with catch means on at least one of said arms for each retention member; a latch member for each of said retention members, rotatably supported by said frame and normally engaging said catch means, and having cam follower means; a disk cam for each of said latch members, rotatably supported by said frame, having grooves in the side thereof, and keyed on a common shaft supported by said frame, positioned to receive said cam follower means in said groove and to actuate said latch member; actuator means to rotate said common shaft and said cams in unison a portion of a revolution to disengage one of said catch means to release one of said articles from one of said stacks; and return means to return said catch means to its normally engaged position.

14. In a sequential release mechanism for a vending machine according to claim 13, a damping device to control at least one of said article retention members comprising: a cylinder containing a fluid; a piston having a spherical periphery, reciprocable in said cylinder with slight clearance; a piston rod fastened to said piston at one end and rotatably connected to said at least one article retention member at the opposite end; and a check valve means in said piston.

15. A sequential release mechanism according to claim 13 having a damping device connected to at least one of said article retention members comprising: a substantially vertical cylinder, open at one end, containing fluid; a piston having a spherical periphery, reciprocable in said cylinder with slight clearance; a piston rod connected to said piston at one end, positioned in said one open end of said cylinder with substantial clearance, and fastened to said article retention member at the opposite end; ball-check valve means in said piston adapted to open upon reciprocation of said piston in one direction and to close upon reciprocation of said piston in the opposite direction; and a collapsible casing member encircling said piston rod connected to said open end of said cylinder at one end and to said piston rod at the opposite end.

16. In a vending machine according to claim 15, a ratchet stop and lock mechanism to intermittently rotate said common shaft comprising: a toothed ratchet rotatably supported on said common shaft, having recesses formed therein; a body member slidable in opposite directions and supported by said frame, having a projection at each end, said projections being alternately engageable with one of said recesses upon alternate sliding movement of said body member; link means rotatably connected to said body member; and a pawl connected to said link means, adapted to engage one tooth of said toothed ratchet during sliding movement of said body member in one direction, to rotate said ratchet thereby, and to disengage from said one tooth and move to another tooth of said toothed ratchet during sliding movement by said body member in the opposite direction.

17. A sequential release mechanism according to claim 13, and a toothed ratchet rotatably supported on said common shaft having recesses formed therein; a body member slidable in opposite directions and supported by said frame member, having projections at each end, said projections being alternately engageable with one of said recesses upon alternate sliding movement of said body member; link means rotatably connected to said body member; and a pawl connected to said link means, adapted to engage one tooth of said toothed ratchet during sliding movement of said body member in one direction to rotate said ratchet thereby, and to disengage from said one tooth and move to another tooth of said toothed ratchet during sliding movement by said body member in the opposite direction.

18. In combination with a sequential release mechanism comprising; a frame; a swingable article-retention member having arms rotatably supported on said frame; a rotatable latch member normally engaging said retention member; a cam rotatably supported by said frame adapted to rotate said latch member to disengage said retention member; and actuator means to rotate said cam: a toothed ratchet rotatably supported on said frame, having recesses formed therein; a body member slidable in opposite directions and supported by said frame member, having a projection at each end, said projections being alternately engageable with one of said recesses upon alternate sliding movement of said body member; link means rotatably connected to said body member; and a pawl connected to said link means, adapted to engage one tooth of said toothed ratchet during sliding movement of said body member in one direction to rotate said ratchet thereby, and to disengage from said one tooth and move to another tooth of said toothed ratchet during sliding movement by said body member in the opposite direction.

19. A sequential release mechanism comprising: a frame; a swingable article-retention member having arms rotatably supported on said frame; a rotatable latch member normally engaging said retention member; a cam rotatably supported by said frame adapted to rotate said latch member to disengage said retention member; and actuator means to rotate said cam: said article-retention member being controlled by a damping device comprising: a cylinder containing a fluid; a piston having a spherical periphery, reciprocable in said cylinder with slight clearance; a piston rod fastened to said piston at one end and having means for connection to said article-retention member at the opposite end; and check valve means in said piston: and said actuator means comprising: a toothed ratchet rotatably supported on said frame, fixedly connected to said cam, having recesses formed therein; a body member slidable in opposite directions and supported by said frame member, having a projection at each end, said projections being alternately engageable with one of said recesses upon alternate sliding movement of said body member; link means rotatably connected to said body member; and a pawl connected to said link means adapted to engage one tooth of said toothed ratchet during sliding movement of said body member in one direction to rotate said ratchet and said cam thereby, and to disengage from said one tooth and move to another tooth of said toothed ratchet during sliding movement of said body member in the opposite direction.

References Cited in the file of this patent

UNITED STATES PATENTS

| Number | Name | Date |
|---|---|---|
| 1,213,548 | Schwieterman | Jan. 23, 1917 |
| 1,312,787 | Hopkins | Aug. 12, 1919 |
| 1,334,728 | Wolters | Mar. 23, 1920 |
| 2,060,316 | Hoesel | Nov. 10, 1936 |
| 2,061,937 | Fay | Nov. 24, 1936 |
| 2,127,769 | Esgro | Aug. 23, 1938 |
| 2,161,420 | Kucher | June 6, 1939 |
| 2,174,715 | Baker | Oct. 3, 1939 |
| 2,185,754 | Rodman | Jan. 2, 1940 |
| 2,346,837 | Grooms | Apr. 18, 1944 |
| 2,357,278 | O'Connor | Aug. 29, 1944 |
| 2,369,882 | Brock | Feb. 20, 1945 |
| 2,393,559 | Pappas | Jan. 22, 1946 |
| 2,585,011 | Johnson | Feb. 12, 1952 |
| 2,585,012 | Johnson | Feb. 12, 1952 |
| 2,679,143 | Helsing | May 25, 1954 |